US011560472B2

(12) United States Patent
Tateno et al.

(10) Patent No.: US 11,560,472 B2
(45) Date of Patent: Jan. 24, 2023

(54) EPOXY RESIN COMPOSITION

(71) Applicant: SEKISUI CHEMICAL CO., LTD., Osaka (JP)

(72) Inventors: Shiori Tateno, Shiga (JP); Tasuku Yamada, Shiga (JP); Yousuke Chiba, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 8 days.

(21) Appl. No.: 16/981,805

(22) PCT Filed: Mar. 26, 2019

(86) PCT No.: PCT/JP2019/012949
§ 371 (c)(1),
(2) Date: Sep. 17, 2020

(87) PCT Pub. No.: WO2019/189226
PCT Pub. Date: Oct. 3, 2019

(65) Prior Publication Data
US 2021/0040304 A1 Feb. 11, 2021

(30) Foreign Application Priority Data
Mar. 28, 2018 (JP) .............................. JP2018-062505

(51) Int. Cl.
*C08L 29/14* (2006.01)
*C08L 63/00* (2006.01)
(52) U.S. Cl.
CPC .............. *C08L 29/14* (2013.01); *C08L 63/00* (2013.01)
(58) Field of Classification Search
CPC .................................. C08L 29/14; C08L 63/00

USPC ........................................................ 525/56
See application file for complete search history.

(56) References Cited

U.S. PATENT DOCUMENTS

| | | | | |
|---|---|---|---|---|
| 2009/0323300 | A1* | 12/2009 | Fujimoto | H05K 3/386 361/784 |
| 2011/0009528 | A1* | 1/2011 | Tomioka | C08G 59/5033 523/428 |
| 2017/0037271 | A1* | 2/2017 | Kobayashi | C09D 11/106 |

FOREIGN PATENT DOCUMENTS

| | | |
|---|---|---|
| JP | 55-108443 | 8/1980 |
| JP | 2010-202862 | 9/2010 |
| JP | 2013-110084 | 6/2013 |
| JP | 2016-117822 | 6/2016 |

(Continued)

OTHER PUBLICATIONS

Extended European Search Report dated Nov. 26, 2021 in corresponding European Application No. 19777171.0.

(Continued)

*Primary Examiner* — David T Karst
(74) *Attorney, Agent, or Firm* — Wenderoth, Lind & Ponack, L.L.P.

(57) ABSTRACT

The present invention provides an epoxy resin composition that is provided with flexibility to combine impact resistance and mechanical strength, while maintaining epoxy resin-specific high elastic modulus, that reduces an increase in viscosity due to mixing, and that is excellent in heat resistance, storage stability, and solvent resistance. Provided is an epoxy resin composition containing: a modified polyvinyl acetal resin having a constitutional unit with an acid-modified group; a reactive diluent; and an epoxy resin, the epoxy resin composition having a sea-island phase separated structure after being cured.

10 Claims, 1 Drawing Sheet

(56) References Cited

FOREIGN PATENT DOCUMENTS

| JP | 2016-188272 | 11/2016 |
|----|-------------|---------|
| JP | 2016-191046 | 11/2016 |
| WO | 2014/051027 | 4/2014 |
| WO | 2014/203797 | 12/2014 |

OTHER PUBLICATIONS

International Search Report dated Jun. 25, 2019 in International (PCT) Application No. PCT/JP2019/012949.

* cited by examiner

EPOXY RESIN COMPOSITION

TECHNICAL FIELD

The present invention relates to an epoxy resin composition that is provided with flexibility to combine impact resistance and mechanical strength, while maintaining epoxy resin-specific high elastic modulus, that reduces an increase in viscosity due to mixing, and that is excellent in heat resistance, storage stability, and solvent resistance.

BACKGROUND ART

Polyvinyl acetal resins are synthesized from polyvinyl alcohol as a raw material, and have an acetyl group, a hydroxyl group, and an acetal group in side chains to show excellent toughness, adhesiveness, crosslinkability, and hygroscopicity. A variation in the ratio of side chain groups can change the resin properties. Owing to such properties, polyvinyl acetal resins are used in a wide range of applications including laminated glass interlayer films for automobiles and ceramic green sheets.

An attempt is now being made to improve resin properties and develop novel functions of polyvinyl acetal resins by introducing a functional group other than acetyl, hydroxyl, and acetal groups into a side chain of the polyvinyl acetal resins.

Polyvinyl acetal resins however have an insufficient adhesive force to metal materials. In addition, a difference in degree of shrinkage between polyvinyl acetal resins and metal materials causes warping or peeling during heat treatment for curing.

To approach this, Patent Literatures 1 and 2 disclose adhesives prepared using a polyvinyl acetal resin and an epoxy resin. These adhesives can exert better adhesiveness to metals. However, when the polyvinyl acetal resin and the epoxy resin are mixed, they are completely dissolved in each other to cause an increase in viscosity, leading to poor workability. In addition, the phase separated structure of the polyvinyl acetal resin and the epoxy resin is difficult to control, and a cured product to be obtained has insufficient impact resistance.

CITATION LIST

Patent Literature

Patent Literature 1: JP 2016-188272 A
Patent Literature 2: JP 2016-191046 A

SUMMARY OF INVENTION

Technical Problem

In view of the state of the art, the present invention aims to provide an epoxy resin composition that is provided with flexibility to combine impact resistance and mechanical strength, while maintaining epoxy resin-specific high elastic modulus, that reduces an increase in viscosity due to mixing, and that is excellent in heat resistance, storage stability, and solvent resistance.

Solution to Problem

The present invention relates to an epoxy resin composition containing: a modified polyvinyl acetal resin having a constitutional unit with an acid-modified group; a reactive diluent; and an epoxy resin, the epoxy resin composition having a sea-island phase separated structure after being cured.

The present invention is specifically described in the following.

As a result of intensive studies, the present inventors found out that a resin composition that contains a modified polyvinyl acetal resin having a constitutional unit with an acid-modified group; a reactive diluent; and an epoxy resin and that forms a specific structure after being cured, can reduce the compatibility between the polyvinyl acetal resin and the epoxy resin. Such a resin composition has a structure in which the polyvinyl acetal resin is dispersed in the epoxy resin to reduce an increase in viscosity thereof, and can provide a cured product having better impact resistance while maintaining high mechanical strength. Thus, the present invention was completed.

The epoxy resin composition of the present invention contains a modified polyvinyl acetal resin having a constitutional unit with an acid-modified group.

With the incorporation of such a modified polyvinyl acetal resin, the epoxy resin composition also containing an epoxy resin can form a crosslinked structure between the modified polyvinyl acetal resin and the epoxy resin. The crosslinked product obtained by curing does not suffer reduction in epoxy resin-specific high elastic modulus, and therefore has high mechanical strength and shows high impact resistance owing to stress relaxation properties exerted by island components formed of the polyvinyl acetal resin serving as a flexible component. Moreover, an increase in viscosity that tends to occur when the modified polyvinyl acetal resin is used in combination with an epoxy resin can be reduced and improvement in heat resistance owing to the crosslinked structure can be expected.

The modified polyvinyl acetal resin has a constitutional unit with an acid-modified group.

Having a constitutional unit with an acid-modified group, the modified polyvinyl acetal resin can show high impact resistance and high mechanical strength.

Examples of the acid-modified group include carboxyl, sulfonic acid, maleic acid, sulfinic acid, sulfenic acid, phosphoric acid, phosphonic acid, and amino groups, and salts thereof. Preferred among these is a carboxyl group.

The constitutional unit with an acid-modified group may have a structure in which an acid-modified group as a side chain is directly bonded to a carbon atom constituting the main chain or a structure in which an acid-modified group as a side chain is bonded to a carbon atom constituting the main chain via an alkylene group.

The constitutional unit with an acid-modified group may have a steric structure in which two acid-modified groups are bonded to the same carbon atom constituting the main chain or a steric structure in which one acid-modified group is bonded to a carbon atom constituting the main chain. Alternatively, the constitutional unit with an acid-modified group may have a steric structure in which an acid-modified group is bonded to each of adjacent carbon atoms constituting the main chain or a steric structure in which an acid-modified group is bonded to one of the adjacent carbon atoms constituting the main chain. A preferred structure is a steric structure in which two acid-modified groups are bonded to the same carbon atom constituting the main chain or a steric structure in which an acid-modified group is bonded to each of adjacent carbon atoms constituting the main chain. Moreover, an increase in the steric hindrance can widen the network structure of a crosslinked product obtainable by combining the modified polyvinyl acetal resin and the epoxy resin. As a result, a cured product to be obtained has better flexibility. Accordingly, the constitutional unit with an acid-modified group more preferably has a steric structure in which two acid-modified groups are bonded to the same carbon atom constituting the main chain.

The constitutional unit with an acid-modified group may have a steric structure having an isotactic arrangement of acid-modified groups bonded to carbon atoms constituting the main chain on one side or a steric structure having a syndiotactic arrangement of acid-modified groups bonded to carbon atoms constituting the main chain at the opposite positions alternately along the chain. Moreover, it may have a steric structure having an atactic arrangement of randomly bonded acid-modified groups.

In the case where the constitutional unit with an acid-modified group has a structure in which an acid-modified group is bonded to a carbon atom constituting the main chain via an alkylene group, the alkylene group is preferably a C1-C10 alkylene group, more preferably a C1-C5 alkylene group, still more preferably a C1-C3 alkylene group.

Examples of the C1-C10 alkylene group include linear alkylene groups, branched alkylene groups, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene groups include cyclopropylene, cyclobutylene, and cyclohexylene groups.

Preferred among these are linear alkylene groups, more preferred are methylene, vinylene, and n-propylene groups, and still more preferred are methylene and vinylene groups.

Examples of the constitutional unit with a carboxyl group include a constitutional unit represented by the following formula (1-1), a constitutional unit represented by the following formula (1-2), a constitutional unit represented by the following formula (1-3), and a constitutional unit represented by the following formula (1-4).

[Chem. 1]

In the formula (1-1), $R^1$ represents a single bond or a C1-C10 alkylene group, and $X^1$ represents a hydrogen atom, a metal atom, or a methyl group.

$R^1$ is preferably a single bond or a C1-C5 alkylene group, more preferably a single bond or a C1-C3 alkylene group.

Examples of the C1-C10 alkylene group include linear alkylene groups, branched alkylene groups, and cyclic alkylene groups.

Examples of the linear alkylene group include methylene, vinylene, n-propylene, tetramethylene, pentamethylene, hexamethylene, octamethylene, and decamethylene groups.

Examples of the branched alkylene group include methyl methylene, methyl ethylene, 1-methyl pentylene, and 1,4-dimethyl butylene groups.

Examples of the cyclic alkylene group include cyclopropylene, cyclobutylene, and cyclohexylene groups.

Preferred among these are linear alkylene groups, more preferred are methylene, vinylene, and n-propylene groups, and still more preferred are methylene and vinylene groups.

Examples of the metal atom include sodium, lithium, and potassium atoms. Preferred among these is sodium atom.

In the formula (1-2), $R^2$ and $R^3$ each independently represent a single bond or a C1-C10 alkylene group and $X^2$ and $X^3$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-3), $R^4$ and $R^5$ each independently represent a single bond or a C1-C10 alkylene group and $X^4$ and $X^5$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-4), $R^6$ and $R^7$ each independently represent a single bond or a C1-C10 alkylene group and $X^6$ and $X^7$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In particular, the modified polyvinyl acetal resin has a structure of preferably any of the formulas (1-2) to (1-4), more preferably the formula (1-4) because the steric hindrance is increased and the network structure of a crosslinked structure formed between the modified polyvinyl acetal resin and the epoxy resin is widened to further improve the impact resistance of a cured product to be obtained.

In the modified polyvinyl acetal resin of the present invention, the acid-modified group may be directly bonded to a carbon atom constituting the main chain of the modified polyvinyl acetal resin or bonded to a carbon atom via a linking group such as an alkylene group.

The modified polyvinyl acetal resin may have the constitutional unit having an acid-modified group in a side chain.

In the modified polyvinyl acetal resin, the lower limit of the amount of the constitutional unit with an acid-modified group is preferably 0.01 mol % and the upper limit thereof is preferably 20.0 mol %.

When the amount of the constitutional unit with an acid-modified group is 0.01 mol % or more, the modified polyvinyl acetal resin shows excellent curability with an epoxy resin. When the amount of the constitutional unit with an acid-modified group is 20.0 mol % or less, the storage stability can be improved. The lower limit of the amount of the constitutional unit with an acid-modified group is more preferably 0.12 mol %, still more preferably 0.55 mol %. The upper limit thereof is more preferably 15.5 mol %, still more preferably 13.0 mol %. The amount of the constitutional unit with an acid-modified group can be measured by NMR.

The modified polyvinyl acetal resin has a constitutional unit with an acetal group represented by the following formula (2-1), a constitutional unit with a hydroxyl group represented by the following formula (2-2), and a constitutional unit with an acetyl group represented by the following formula (2-3).

[Chem. 2]

In the formula (2-1), $R^8$ represents a hydrogen atom or a C1-C20 alkyl group.

$R^8$ is preferably a hydrogen atom or a C1-C12 alkyl group.

Examples of the C1-C20 alkyl group include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl groups. Preferred among these are methyl, ethyl, and propyl groups.

In the modified polyvinyl acetal resin, the lower limit of the amount of the constitutional unit with an acetal group (hereafter, also referred to as acetal group content) is preferably 60 mol % and the upper limit thereof is preferably 90 mol %. When the acetal group content is 60 mol % or more, the modified polyvinyl acetal resin can be sufficiently precipitated in the synthesis process by a precipitation method.

When the acetal group content is 90 mol % or less, the compatibility with an epoxy resin is enhanced. The lower limit of the acetal group content is more preferably 65 mol % and the upper limit thereof is more preferably 85 mol %.

The ratio between the acetoacetal group content and the butyral group content in the modified polyvinyl acetal resin is preferably 6:4 to 10:0, more preferably 8:2 to 10:0, still more preferably 9:1 to 10:0.

The lower limit of the amount of the constitutional unit with a hydroxyl group (hereafter, also referred to as hydroxyl group content) in the modified polyvinyl acetal resin is preferably 15 mol % and the upper limit thereof is preferably 35 mol %. When the hydroxyl group content is 15 mol % or more, the toughness of the modified polyvinyl acetal resin is sufficiently high, leading to favorable strength of a crosslinked product to be obtained. When the hydroxyl group content is 35 mol % or less, the polarity of the modified polyvinyl acetal resin is not too high, so that troubles such as cracking in a crosslinked product to be obtained are reduced, and peeling properties are favorable. The lower limit of the hydroxyl group content is more preferably 17 mol % and the upper limit thereof is more preferably 30 mol %.

The lower limit of the amount of the constitutional unit with an acetyl group (hereafter, also referred to as an acetyl group content) in the modified polyvinyl acetal resin is preferably 0.1 mol % and the upper limit thereof is preferably 25 mol %, more preferably 15 mol %.

The average degree of polymerization of the modified polyvinyl acetal resin is not limited. The lower limit thereof is preferably 200 and the upper limit thereof is preferably 4,000. When the average degree of polymerization of the modified polyvinyl acetal resin is 200 or more, the resulting epoxy resin composition has sufficient viscosity. When the average degree of polymerization of the modified polyvinyl acetal resin is 4,000 or less, the application properties of the resulting epoxy resin composition are favorable in the use where the composition is applied, resulting in better handleability. Moreover, the adhesive force is further improved.

The lower limit of the average degree of polymerization is more preferably 250 and the upper limit thereof is more preferably 3,000.

Examples of the method of producing the modified polyvinyl acetal resin include a method of acetalizing, by a conventionally known method, polyvinyl alcohol obtained by saponification of polyvinyl acetate that is prepared by copolymerization of a monomer having an acid-modified group and vinyl acetate. An acid-modified group may be introduced by post modification of a polyvinyl acetal resin that is prepared by acetalizing, by a conventionally known method, unmodified polyvinyl alcohol.

In other words, the modified polyvinyl acetal resin may be an acetalization product of polyvinyl alcohol having an acid-modified group or an acetalization product of unmodified polyvinyl alcohol to which an acid-modified group is introduced.

Examples of the monomer having an acid-modified group include monocarboxylic acids such as acrylic acid, crotonic acid, methacrylic acid, and oleic acid, dicarboxylic acids such as methylene malonic acid, itaconic acid, 2-methylene glutaric acid, 2-methylene adipic acid, and 2-methylene sebacic acid, maleic anhydride, and metal salts of these.

The acetalization may be carried out by a known method, and is preferably carried out in a water solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, and amine solvents.

Examples of the alcoholic organic solvents include methanol, ethanol, n-propanol, isopropanol, n-butanol, and tert-butanol.

Examples of the aromatic organic solvent include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of solubility in resin and easy purification, particularly preferred among these are ethanol, n-propanol, isopropanol, and tetrahydrofuran.

The acetalization is preferably carried out in the presence of an acid catalyst.

The acid catalyst is not limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluene sulfonic acid. These acid catalysts may be used alone, or two or more types of compounds may be used in combination. Preferred among these are hydrochloric acid, nitric acid, and sulfuric acid, and particularly preferred is hydrochloric acid.

The aldehyde used for the acetalization may be an aldehyde having a C1-C10 chain aliphatic group, a C1-C10 cyclic aliphatic group, or a C1-C10 aromatic group. The aldehyde used may be a conventionally known aldehyde. The aldehyde used for the acetalization is not limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde.

These aldehydes may be used alone, or two or more types thereof may be used in combination. Preferred among these aldehydes are formaldehyde, acetaldehyde, butyraldehyde, 2-ethylhexylaldehyde, and n-nonylaldehyde because they are excellent in acetalization reactivity and can give the resin to be prepared a sufficient internal plasticization effect to impart favorable flexibility. More preferred are formaldehyde, acetaldehyde, and butyraldehyde because they can provide a resin composition particularly excellent in impact resistance and adhesiveness to metal.

The amount of the aldehyde can be appropriately determined in accordance with the acetal group content of the aimed modified polyvinyl acetal resin. The amount of the aldehyde may be appropriately determined in accordance with the acetal group content of the aimed modified polyvinyl acetal resin. In particular, the amount is 60 to 95 mol %, preferably 65 to 90 mol % relative to 100 mol % of the polyvinyl alcohol because the acetalization reaction can be carried out efficiently and an unreacted aldehyde is easily removable.

In the epoxy resin composition of the present invention, the lower limit of the amount of the modified polyvinyl acetal resin is preferably 0.5% by weight and the upper limit thereof is preferably 50% by weight.

When the amount of the modified polyvinyl acetal resin is 0.5% by weight or more, high toughness can be exhibited when the epoxy resin composition of the present invention is used as an adhesive. When the amount is 50% by weight or less, high adhesiveness can be exhibited.

The lower limit of the amount of the modified polyvinyl acetal resin is more preferably 1.0% by weight, still more preferably 10% by weight and the upper limit thereof is more preferably 40% by weight, still more preferably 30% by weight.

In the epoxy resin composition of the present invention, the lower limit of the amount of the modified polyvinyl acetal resin relative to 100 parts by weight of the epoxy resin and the reactive diluent in total is preferably 0.1 parts by weight, and the upper limit thereof is preferably 50 parts by weight.

When the amount of the modified polyvinyl acetal resin is 0.1 parts by weight or more, the modified polyvinyl acetal resin is crosslinked with the epoxy resin to improve the impact resistance. When the amount of the modified polyvinyl acetal resin is 50 parts by weight or less, an increase in viscosity and a decrease in storage stability can be reduced.

The lower limit of the amount of the modified polyvinyl acetal resin is more preferably 10 parts by weight and the upper limit thereof is more preferably 30 parts by weight.

The epoxy resin composition of the present invention contains a reactive diluent.

The reactive diluent used is preferably liquid at 25° C. and has a viscosity at 25° C. of 10.0 to 300mPa·s, more preferably 20.0 to 100 mPa·s.

Examples of the reactive diluent include acyclic aliphatic compounds having a glycidyl group in the molecule such as glycidyl ethers of aliphatic alcohols and glycidyl esters of polyvalent fatty acids. The reactive diluent preferably has one to three glycidyl groups in the molecule.

Examples of the glycidyl ethers of aliphatic alcohols include glycidyl ethers having a C2-C25 alkylene structure and diglycidyl ethers having a C2-C25 alkylene oxide structure. The number (n) of repeating units of the alkylene oxide structure is preferably 1 to 25, more preferably 2 to 10. Specific examples thereof include butyl glycidyl ether, lauryl glycidyl ether, neopentyl glycol diglycidyl ether, propylene glycol diglycidyl ether, polypropylene glycol diglycidyl ether, and 1,6-hexanediol diglycidyl ether. Preferred among these are polypropylene glycol diglycidyl ether and 1,6-hexanediol diglycidyl ether.

Examples of the glycidyl esters of polyvalent fatty acids include diglycidyl oxalate, diglycidyl maleate, diglycidyl succinate, diglycidyl glutarate, diglycidyl adipate, and diglycidyl pimelate.

The lower limit of the epoxy equivalent (molecular weight per epoxy group) of the reactive diluent having a glycidyl group in the molecule is preferably 120 and the upper limit thereof is preferably 800.

The lower limit of the molecular weight of the reactive diluent is preferably 120 and the upper limit thereof is preferably 1,500.

The lower limit of the amount of the reactive diluent relative to the total of the epoxy resin and the reactive diluent in the epoxy resin composition of the present invention is preferably 1% by weight and the upper limit thereof is preferably 50% by weight.

When the amount of the reactive diluent is not less than the preferable lower limit and not more than the preferable upper limit, the sea-island phase separated structure is easily formed after curing of the resulting epoxy resin composition.

The lower limit of the amount of the reactive diluent is more preferably 5% by weight and the upper limit thereof is more preferably 30% by weight.

In the epoxy resin composition of the present invention, the lower limit of the ratio of the amount of the modified polyvinyl acetal resin to the amount of the reactive diluent (amount of modified polyvinyl acetal resin/amount of reactive diluent) is preferably 0.1, more preferably 0.4, and the upper limit thereof is preferably 2, more preferably 1.

The epoxy resin composition of the present invention contains an epoxy resin.

Incorporation of the epoxy resin enables crosslinking under application of energy by heating or the like, realizing high adhesiveness.

Examples of the epoxy resin include aromatic epoxy resins, alicyclic epoxy resins, and heterocyclic epoxy resins.

Examples of the aromatic epoxy resins include glycidyl ethers and glycidyl esters of polyphenols and glycidyl aromatic polyamines.

Examples of the glycidyl ethers of polyphenols include bisphenol A-type epoxy resins, bisphenol F-type epoxy resins, and phenol novolac-type epoxy resins.

Examples of the glycidyl esters of polyphenols include diglycidyl phthalate, diglycidyl isophthalate, and diglycidyl terephthalate.

Examples of the glycidyl aromatic polyamines include N,N-diglycidyl aniline, N,N,N',N'-tetraglycidyl xylylenediamine, and N,N,N',N'-tetraglycidyl diphenylmethane diamine.

Examples of the heterocyclic epoxy resins include triglycidyl isocyanate and triglycidyl melamine.

Examples of the alicyclic epoxy resins include hydrogenated bisphenol A-type epoxy resins, hydrogenated bisphenol F-type epoxy resins, hydrogenated diglycidyl phthalate, and 3',4'-epoxy cyclohexyl methyl-3,4-epoxy cyclohexane carboxylate.

One type of the epoxy resin may be used alone or two or more types thereof may be used in combination. From the standpoint of improving the adhesive force, an aromatic epoxy resin is preferably used among these epoxy resins.

The lower limit of the epoxy equivalent (molecular weight per epoxy group) of the epoxy resin is preferably 90 and the upper limit thereof is preferably 700.

When the epoxy equivalent is not less than the preferable lower limit, curing failure is not likely to occur, leading to sufficient improvement of the mechanical strength. When the epoxy equivalent is not more than the preferable upper limit, the molecular weight between crosslinking points is lowered, leading to improvement of heat resistance.

The lower limit of the epoxy equivalent is more preferably 100 and the upper limit thereof is more preferably 600.

The lower limit of the molecular weight of the epoxy resin is preferably 100 and the upper limit thereof is preferably 5,500.

When the molecular weight is 100 or more, the mechanical strength and heat resistance of the crosslinked product can be sufficiently improved. When the molecular weight is 5,500 or less, the crosslinked product is not too rigid and has sufficient strength.

The molecular weight is more preferably 200 to 1,000.

In the epoxy resin composition of the present invention, the lower limit of the amount of the epoxy resin is preferably 0.5% by weight, and the upper limit thereof is preferably 99.5% by weight.

When the amount of the epoxy resin is 0.5% by weight or more, the adhesiveness of the epoxy resin composition can be further improved. When the amount of the epoxy resin is 99.5% by weight or less, the toughness of the epoxy resin composition can be improved.

The lower limit of the amount of the epoxy resin is more preferably 1.0% by weight and the upper limit thereof is more preferably 90.0% by weight.

In the epoxy resin composition of the present invention, the lower limit of the ratio between the number of acid-modified groups and the number of epoxy groups in the modified polyvinyl acetal resin (number of acid-modified groups/number of epoxy groups) is preferably 0.001 and the upper limit thereof is preferably 0.25.

The lower limit is more preferably 0.004, still more preferably 0.005 and the upper limit is more preferably 0.23, still more preferably 0.2.

When the ratio between the number of acid-modified groups and the number of epoxy groups is not less than the preferable lower limit and not more than the preferable upper limit, the cured product of the resulting epoxy resin composition can have better impact resistance.

The ratio between the amount of the reactive diluent and the amount of the epoxy resin (amount of the reactive diluent:amount of the epoxy resin) is preferably 1:99 to 50:50, more preferably 5:95 to 30:70.

When the ratio between the amount of the reactive diluent and the amount of the epoxy resin is not less than the preferable lower limit and not more than the preferable upper limit, the sea-island phase separated structure is easily formed after curing of the resulting epoxy resin composition, leading to further improvement of the adhesiveness to hard-to-bond polymers.

In the epoxy resin composition of the present invention, the lower limit of the amount of the epoxy resin is preferably 10% by weight and the upper limit thereof is preferably 70% by weight.

When the amount of the epoxy resin is not less than the above preferable lower limit and not more than the above preferable upper limit, the adhesiveness of the epoxy resin composition to hard-to-bond polymers can be further improved.

The lower limit of the amount of the epoxy resin is more preferably 30% by weight and the upper limit thereof is more preferably 50% by weight.

In the epoxy resin composition of the present invention, the lower limit of the ratio between the amount of the polyvinyl acetal resin and the amount of the epoxy resin (amount of the polyvinyl acetal resin/amount of the epoxy resin) is preferably 2/9, more preferably 2/7 and the upper limit thereof is preferably 2, more preferably 1.

In the epoxy resin composition of the present invention, the lower limit of the total amount of the reactive diluent and the epoxy resin is preferably 50% by weight, more preferably 60% by weight and the upper limit thereof is preferably 90% by weight, more preferably 80% by weight.

The epoxy resin composition of the present invention preferably contains an epoxy curing agent.

Examples of the epoxy curing agent include amine curing agents, imidazole curing agents, guanidine curing agents, thiol curing agents, phenol resin curing agents, and acid anhydride curing agents. Preferred among these are imidazole curing agents.

When the epoxy resin composition is reacted using a radical polymerizable curing agent prior to polymerization of epoxy by an epoxy curing agent, a radical polymerization initiator makes a radical polymerization reaction of (meth) acrylic groups contained in the reactive diluent proceed first. In such a case, the sea-island phase separated structure is not formed after curing.

Examples of the amine curing agents include polyethylene polyamines such as ethylenediamine, 1,3-diaminopropane, 1,4-diaminobutane, hexamethylenediamine, 2,2,4-trimethyl hexamethylenediamine, 1,10-diaminodecane, 1,12-diaminododecane, diethylenetriamine, triethylenetetramine, tetraethylene pentamine, and pentaethylene hexamine; and cyclic amines such as 1,2-diaminocyclohexane, 1,3-bis(aminomethyl)cyclohexane, methaxylylenediamine, norbornane diamine, 4,4'-diaminodicyclohexyl methane, 2,2'-dimethyl-4,4'-diaminodicyclohexyl methane, and 4,4'-diaminodiphenyl methane.

Examples of the imidazole curing agents include imidazole compounds such as imidazole, 2-methylimidazole, 1,2-dimethylimidazole, 2-ethyl-4-methylimidazole, 2-undecyl imidazole, 2-heptadecylimidazole, 2-phenyl imidazole, 2-phenyl-4-methylimidazole, 1-benzyl imidazole, 1-benzyl-2-phenyl imidazole, and 1-cyanoethyl-2-methylimidazole.

Examples of the guanidine curing agents include dicyandiamide, tetramethyl guanidine, biguanide, n-butyl guanidine, and guanyl thiourea.

Examples of the thiol curing agents include tris(3-mercaptopropionate), butanediol bis(3-mercaptopropionate), ethylene glycol bis(3-mercaptopropionate), tetraethylene glycol bis(3-mercaptopropionate), trimethylolpropane tris (3-mercaptopropionate), pentaerythritol tetrakis (3-mercaptopropionate), dipentaerythritol hexakis(3-mercaptopropionate), 1,4-bis(3-mercaptobutyryloxy)butane, pentaerythritol tetrakis(3-mercaptobutyrate), tris(3-mercaptobutyryloxyethyl)isocyanurate, trimethylolethane(3-mercaptobutyrate), trimethylolpropane tris(3-mercaptobutyrate), trisbutanediol bisthioglycolate, hexanediol thioglycolate, trimethylolpropane tristhioglycolate, and pentaerythritol tetrakis thioglycolate.

Examples of the phenol resin curing agents include phenol novolac resins, bisphenol novolac resins, and cresol novolac resins.

Examples of the acid anhydride curing agents include hexahydrophthalic anhydride, 1,2,3,6-tetrahydrophthalic anhydride, 3,4,5,6-tetrahydrophthalic anhydride, 4-methyl tetrahydrophthalic anhydride, 4-methyl hexahydrophthalic anhydride, bicyclo[2.2.1]heptane-2,3-dicarboxylic anhydride, methyl bicyclo[2.2.1]heptane-2,3-dicarboxylic anhydride, methyl-3,6-endomethylene-1,2,3,6-tetrahydrophthalic anhydride, succinic anhydride, and octenylsuccinic anhydride.

In the epoxy resin composition of the present invention, the lower limit of the amount of the epoxy curing agent relative to 100 parts by weight of the reactive diluent and the epoxy resin in total is preferably 4.5 parts by weight and the upper limit thereof is preferably 20 parts by weight.

When the amount of the epoxy curing agent is 4.5 parts by weight or more, the sea-island phase separated structure is easily formed after curing of the resulting epoxy resin composition and the dispersion diameter of the island component is easily adjustable within a preferable range.

The lower limit of the amount of the epoxy curing agent is more preferably 8 parts by weight and the upper limit thereof is more preferably 15 parts by weight.

The lower limit of the amount of the epoxy curing agent in the epoxy resin composition of the present invention is preferably 5% by weight, more preferably 7% by weight and the upper limit thereof is preferably 15% by weight, more preferably 13% by weight.

The epoxy resin composition of the present invention may further contain inorganic filler, a crosslinking agent, an organic solvent, or the like in addition to the polyvinyl acetal resin, the reactive diluent, the epoxy resin, and the epoxy curing agent.

Normally, when an epoxy resin composition is cured, the viscosity is significantly lowered under heating for curing to increase the fluidity, leading to uneven distribution of island components. Incorporation of inorganic filler improves the viscosity retention to appropriately maintain the fluidity, thereby reducing uneven distribution of island components. Accordingly, a favorable sea-island phase separated structure can be formed.

Examples of the inorganic filler include metal oxides such as aluminum oxide, magnesium oxide, and calcium oxide; metal hydroxides such as aluminum hydroxide, magnesium hydroxide, and calcium hydroxide; carbonates such as magnesium carbonate and calcium carbonate; metal nitrides such as boron nitride and silicon nitride; silicon oxide; and talc.

In the epoxy resin composition of the present invention, the lower limit of the amount of the inorganic filler relative to 100 parts by weight of the epoxy resin and the reactive diluent in total is preferably 5 parts by weight and the upper limit thereof is preferably 30 parts by weight.

Examples of the crosslinking agent include halohydrin compounds such as epichlorohydrin and epibromohydrin; halogen compounds such as 1,2-dichloroethane and 1,3-dichloropropane; isocyanate compounds such as hexamethylene diisocyanate; bis acrylamide compounds such as N,N'-methylenebisacrylamide and N,N'-ethylenebisacrylamide; urea compounds such as urea and thiourea; guanidine compounds such as guanidine and diguanide; dicarboxylic acid compounds such as oxalic acid and adipic acid; unsaturated carboxylic acid compounds such as acrylic acid and methacrylic acid; unsaturated carboxylate compounds such as methyl acrylate, methyl methacrylate, 2-ethylhexyl acrylate, isobutyl acrylate, butyl acrylate, 2-ethylhexyl methacrylate, isobutyl methacrylate, and butyl methacrylate; and aldehyde compounds including dialdehydes such as glyoxal, glutaraldehyde, malonaldehyde, succinaldehyde, adipaldehyde, phthalaldehyde, isophthalaldehyde, and terephthalaldehyde. Each of these may be used alone or in combination of two or more. These crosslinking agents may be optionally dissolved in water or an organic solvent such as alcohol before use.

Examples of the organic solvent include ketones such as acetone, methyl ethyl ketone, dipropyl ketone, and diisobutyl ketone; alcohols such as methanol, ethanol, isopropanol, and butanol; aromatic hydrocarbons such as toluene and xylene; esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate; and methyl cellosolve, ethyl cellosolve, butyl cellosolve, terpineol, dihydroterpineol, butyl cellosolve acetate, butyl carbitol acetate, terpineol acetate, and dihydroterpineol acetate.

In the epoxy resin composition of the present invention, the amount of the organic solvent is not limited. Yet, the amount of the organic solvent is preferably 10.0% by weight or less, more preferably 0% by weight.

When the amount of the organic solvent is 10.0% by weight or less, curing inhibition is not likely to occur.

The epoxy resin composition of the present invention may contain additives such as a plasticizer and a dispersant within a range that the effects of the present invention are not impaired.

The lower limit of the viscosity at a shear rate of 1/s of the epoxy resin composition of the present invention is preferably 150 Pa·s and the upper limit thereof is preferably 650 Pa·s.

The viscosity can be measured with a rheometer under the condition of 25° C.

The lower limit of the thixotropic index (TI) of the epoxy resin composition of the present invention is preferably 2.0, more preferably 3.0 and the upper limit thereof is preferably 10.0, more preferably 7.0.

When the TI is within the preferable range, dripping upon application of the epoxy resin composition can be prevented. Also, the epoxy resin composition can have better handleability to show excellent applicability.

The TI can be calculated by dividing the viscosity measured at 25° C. at a shear rate of 1/s by the viscosity measured at 25° C. at a shear rate of 10/s.

The epoxy resin composition of the present invention has a sea-island phase separated structure after being cured.

Formation of the sea-island phase separated structure provides an adhesive having excellent impact resistance while maintaining high elastic modulus. The curing is performed under the conditions of 160° C. for one hour.

The present invention also encompasses the cured product obtained by curing the epoxy resin composition of the present invention.

Adjustment of the ratio between the acetoacetal group content and the butyral group content or the amount of the constitutional unit having an acid-modified group in the modified polyvinyl acetal resin and adjustment of the amounts of the modified polyvinyl acetal resin and the reactive diluent enable the epoxy resin composition of the present invention to have a sea-island phase separated structure after being cured.

The sea-island phase separated structure refers to a structure including: a continuous phase formed of a polymerized product of the reactive diluent and the epoxy resin; and a dispersion phase formed of the polyvinyl acetal resin dispersed in the continuous phase.

The presence of a sea-island phase separated structure in the cured product of the epoxy resin composition can be confirmed, for example, by a method of cutting the obtained cured product with a razor blade or a microtome and observing the cut surface using an electron microscope (e.g., transmission electron microscope, scanning electron microscope) or an atomic force microscope. The presence of a sea-island phase separated structure can also be confirmed by the presence of two T parts by weight peaks in measurement with a differential scanning calorimeter and two tan δ peaks in dynamic viscoelasticity measurement.

As a method for the curing, a method by heating can be mentioned.

In the case of thermally curing the epoxy resin composition by heating, the heating temperature is not limited and is preferably 120° C. to 220° C. With the heating temperature of 120° C. or higher, crosslinking can proceed sufficiently to give favorable strength. With the heating temperature of 220° C. or lower, the cured product is not thermally degraded to show its properties sufficiently. The lower limit of the heating temperature is more preferably 140° C. and the upper limit thereof is more preferably 200° C.

Though not particularly limited, the lower limit of heating duration is preferably 20 minutes and the upper limit thereof is preferably two hours. With the heating duration of 20 minutes or longer, crosslinking can proceed sufficiently to give sufficient strength. With the heating duration of two hours or shorter, the cured product is not thermally degraded to show its properties sufficiently.

In the sea-island phase separated structure formed after curing of the epoxy resin composition of the present invention, the upper limit of the average dispersion diameter of the island component is 5.0 µm.

When the average dispersion diameter of the island component is not more than 5.0 µm, the impact resistance can be improved and the elastic modulus can be maintained.

The lower limit of the average dispersion diameter of the island components is preferably 0.05 µm and the upper limit thereof is preferably 2.0 µm.

The average dispersion diameter of the island components can be measured by observation with an electron microscope such as a transmission electron microscope or a scanning electron microscope.

In the sea-island phase separated structure formed after curing of the epoxy resin composition of the present invention, the flattening of the island components is preferably 0 to 0.5, more preferably 0 to 0.25.

When the flattening is within the above preferable range, the stress dispersibility is excellent.

The flattening is the proportion of the difference between the major axis (a) and the minor axis (b) relative to the major axis (a) of the island components (1−(b/a)). It can be measured by observation with an electron microscope such as a transmission electron microscope or a scanning electron microscope.

In the sea-island phase separated structure formed after curing of the epoxy resin composition of the present invention, the number of the island components per 10 µm×10 µm is preferably 50 to 1,000, more preferably 500 to 950.

In the sea-island phase separated structure formed after curing of the epoxy resin composition of the present invention, the volume ratio between the sea component and the island components is preferably 9:1 to 5:5.

The lower limit of tan δ of the cured product of the epoxy resin composition of the present invention measured under the condition of a rate of temperature rise of 6° C./min is preferably 0.36, more preferably 0.41, still more preferably 0.47 and the upper limit thereof is preferably 0.68, more preferably 0.62, still more preferably 0.57.

The tan δ (loss tangent) refers to a ratio (loss modulus G"/storage modulus G') of the loss modulus (G") to the storage modulus (G') determined by dynamic viscoelasticity measurement.

The tan δ can be measured with a dynamic viscoelastometer, for example.

A rate of change of the above tan δ relative to tan δ of a cured product of a composition prepared by removing the modified polyvinyl acetal resin from the epoxy resin composition of the present invention is preferably 0% to 30%, more preferably 0% to 20%, still more preferably 0% to 10%.

The cured product of the epoxy resin composition of the present invention has a haze value of preferably 25% or higher, more preferably 35% or higher, still more preferably 45% or higher.

The haze value can be measured with a haze meter.

The epoxy resin composition of the present invention can be suitably used for applications in which conventional polyvinyl acetal resins have been used. For example, it can be used to obtain coating solutions for producing ceramic molded articles, metal pastes, heat-developing photosensitive materials, coating materials, ink, and reflective sheets. The epoxy resin composition of the present invention can be also used as an adhesive such as an adhesive for films used in display devices, an interlayer adhesive for ceramic laminates, and a structural adhesive for automobiles and buildings.

Advantageous Effects of Invention

The present invention can provide an epoxy resin composition that is provided with flexibility to combine impact resistance and mechanical strength, while maintaining epoxy resin-specific high elastic modulus, that reduces an increase in viscosity due to mixing, and that is excellent in heat resistance, storage stability, and solvent resistance.

DESCRIPTION OF EMBODIMENTS

The present invention is more specifically described in the following with reference to, but not limited to, examples.

EXAMPLE 1

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 75 g of acetaldehyde, and 10 g of butyraldehyde. The acetalization reaction was carried out to precipitate a reaction product by maintaining the solution temperature at 40° C.

The polyvinyl alcohol used had an average degree of polymerization of 1,500, a degree of saponification of 98.8 mol %, and contained 1.0 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of the constitutional unit with a carboxyl group represented by the formula (1-4) (amount: 1.0 mol %).

Table 1 shows the acetal group content, the acetyl group content, and the hydroxyl group content measured by $^{13}$C-NMR.

An amount of 20 parts by weight of the obtained modified polyvinyl acetal resin, 20 parts by weight of a reactive diluent, 80 parts by weight of an epoxy resin, 3.0 parts by weight of dicyandiamide and 2.0 parts by weight of an imidazole compound as curing agents, and 20.0 parts by weight of an inorganic filler were mixed to prepare an epoxy resin composition.

The raw materials used are listed below.
(Epoxy Resin)
  Bisphenol A-type epoxy resin (jER828, product of Mitsubishi Chemical Corporation, epoxy equivalent of 190, molecular weight of 370)
(Reactive Diluent)
  Polypropylene glycol diglycidyl ether (EX920, product of Nagase ChemteX Corporation, epoxy equivalent of 176, molecular weight of 350)
(Curing Agent)
  Dicyandiamide (DICY7, product of Mitsubishi Chemical Corporation)
  Imidazole compound (jERCURE EMI24, product of Mitsubishi Chemical Corporation)
(Inorganic Filler)
  Calcium carbonate (Whiten P-30, product of Shiraishi Calcium Kaisha Ltd.)

EXAMPLE 2

An amount of 200 g of polyvinyl alcohol was added to 1,800 g of pure water, and stirred at 90° C. for about two hours to be dissolved. The solution was cooled to 40° C., and to the solution were added 150 parts by weight of hydrochloric acid having a concentration of 35% by weight, 75 g of acetaldehyde, and 10 g of butyraldehyde. The acetalization reaction was carried out to precipitate a reaction product by maintaining the solution temperature at 40° C.

The polyvinyl alcohol used had an average degree of polymerization of 2,600, a degree of saponification of 98.8 mol %, and contained 1.0 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of the constitutional unit with a carboxyl group represented by the formula (1-4) (amount: 1.0 mol %).

An epoxy resin composition was produced as in Example 1, except that the obtained modified polyvinyl acetal resin was used.

EXAMPLE 3

An amount of 200 g of polyvinyl alcohol were added to 1,800 g of pure water, and stirred at 90° C. for about two hours to be dissolved. The solution was cooled to 40° C., and to the solution were added 150 g of hydrochloric acid having a concentration of 35% by weight, 75 g of acetaldehyde, and 10 g of butyraldehyde. The acetalization reaction was carried out to precipitate a reaction product by maintaining the solution temperature at 40° C.

The polyvinyl alcohol used had an average degree of polymerization of 1,500, a degree of saponification of 98.8 mol %, and contained 2.0 mol % of a constitutional unit with a carboxyl group represented by the formula (1-4) (in the formula (1-4), $R^6$ represents a single bond, $X^6$ represents a hydrogen atom, $R^7$ represents a methylene group, $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of the constitutional unit with a carboxyl group represented by the formula (1-4) (amount: 2.0 mol %).

Table 1 shows the acetal group content, the acetyl group content, and the hydroxyl group content measured by $^{13}$C-NMR.

An epoxy resin composition was produced as in Example 1, except that the obtained modified polyvinyl acetal resin was used.

EXAMPLE 4

An amount of 200 parts by weight of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 75 g of acetaldehyde, and 10 g of butyraldehyde. The acetalization reaction was carried out to precipitate a reaction product by maintaining the solution temperature at 40° C.

The polyvinyl alcohol used had an average degree of polymerization of 1,500, a degree of saponification of 98.8 mol %, and contained 10.0 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of the constitutional unit with a carboxyl group represented by the formula (1-4) (amount: 10.0 mol %).

Table 1 shows the acetal group content, the acetyl group content, and the hydroxyl group content measured by $^{13}$C-NMR.

An epoxy resin composition was produced as in Example 1, except that the obtained modified polyvinyl acetal resin was used.

EXAMPLE 5

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 80 g of acetaldehyde. The acetalization reaction was carried out to precipitate a reaction product by maintaining the solution temperature at 40° C.

The polyvinyl alcohol used had an average degree of polymerization of 1,500, a degree of saponification of 98.8 mol %, and contained 1.0 mol % of a constitutional unit with a carboxyl group represented by the formula (1-4) (in the formula (1-4), $R^6$ represents a single bond, $X^6$ represents a hydrogen atom, $R^7$ represents a methylene group, $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of a constitutional unit with a carboxyl group represented by the formula (1-4) (amount: 1.0 mol %).

An epoxy resin composition was produced as in Example 1, except that the obtained modified polyvinyl acetal resin was used.

EXAMPLES 6 TO 9

Epoxy resin compositions were produced as in Example 1, except that the modified polyvinyl acetal resin obtained in Example 1 was used and that the amount of the polyvinyl acetal resin and the type and amount of the reactive diluent were changed as shown in Table 1.

The reactive diluent mentioned below was used in Example 8.
(Reactive Diluent)
1,6-Hexanediol diglycidyl ether (EX212, product of Nagase ChemteX Corporation, epoxy equivalent of 151, molecular weight of 300)

EXAMPLE 10

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 70 g of acetaldehyde, and 8 g of butyraldehyde. The acetalization reaction was carried out to precipitate a reaction product by maintaining the solution temperature at 40° C.

The polyvinyl alcohol used had an average degree of polymerization of 1,500, a degree of saponification of 98.8 mol %, and contained 18.0 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of a constitutional unit with a carboxyl group represented by the formula (1-4) (amount: 18.0 mol %).

An epoxy resin composition was produced as in Example 1, except that the obtained modified polyvinyl acetal resin was used.

EXAMPLE 11

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 50 g of acetaldehyde, and 50 g of butyraldehyde. The acetalization reaction was carried out to precipitate a reaction product by maintaining the solution temperature at 40° C.

The polyvinyl alcohol used had an average degree of polymerization of 1,500 and a degree of saponification of 98.8 mol %, and contained 1.0 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of a constitutional unit with a carboxyl group represented by the formula (1-4) (amount: 1.0 mol %).

An epoxy resin composition was produced as in Example 1, except that the obtained modified polyvinyl acetal resin was used.

EXAMPLE 12

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 75 g of acetaldehyde, and 10 g of butyraldehyde. The acetalization reaction was carried out to precipitate a reaction product by maintaining the solution temperature at 40° C.

The polyvinyl alcohol used had an average degree of polymerization of 320, a degree of saponification of 98.8 mol %, and contained 0.05 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained by neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of a constitutional unit with a carboxyl group represented by the formula (1-4) (amount: 0.05 mol %).

An epoxy resin composition was produced as in Example 1, except that the obtained modified polyvinyl acetal resin was used.

EXAMPLE 13

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 75 g of acetaldehyde, and 10 g of butyraldehyde. The acetalization reaction was carried out to precipitate a reaction product by maintaining the solution temperature at 40° C.

The polyvinyl alcohol used had an average degree of polymerization of 1,500 and a degree of saponification of 98.8 mol %, and contained 23.0 mol % of a constitutional unit with a carboxyl group represented by the formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$D_6$ (dimethylsulfoxide), and analyzed by $^{13}$C-NMR (nuclear magnetic resonance spectrum) to confirm the presence of a constitutional unit with a carboxyl group represented by the formula (1-4) (amount: 23.0 mol %).

An epoxy resin composition was produced as in Example 1, except that the obtained modified polyvinyl acetal resin was used.

EXAMPLES 14 AND 15

Epoxy resin compositions were produced as in Example 1, except that the modified polyvinyl acetal resin obtained in Example 1 was used and that the amount of the polyvinyl acetal resin and the type and amount of the reactive diluent were changed as shown in Table 1.

COMPARATIVE EXAMPLE 1

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 75 g of acetaldehyde, and 10 g of butyraldehyde. The acetalization reaction was carried out to precipitate a reaction product by maintaining the solution temperature at 40° C.

The polyvinyl alcohol used had an average degree of polymerization of 1,500 and a degree of saponification of 98.8 mol %.

Then, the reaction solution was held to maintain the temperature at 40° C. for three hours, thereby completing the reaction. A polyvinyl acetal resin powder was obtained through neutralization, washing with water, and drying by normal methods.

The obtained polyvinyl acetal resin was dissolved in DMSO-$D_6$ (dimethylsulfoxide), and analyzed by $^{13}$C-NMR (nuclear magnetic resonance spectrum) to fail to identify the presence of a constitutional unit with an acid-modified group.

Table 1 shows the acetal group content, the acetyl group content, and the hydroxyl group content measured by $^{13}$C-NMR.

An epoxy resin composition was produced as in Example 1, except that the obtained modified polyvinyl acetal resin was used.

COMPARATIVE EXAMPLE 2

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 150 g of acetaldehyde. The acetalization reaction was carried out to precipitate a reaction product by maintaining the solution temperature at 40° C.

The polyvinyl alcohol used had an average degree of polymerization of 1,500 and a degree of saponification of 98.8 mol %.

Then, the reaction solution was held to maintain the temperature at 40° C. for three hours, thereby completing the reaction. A modified polyvinyl acetal resin powder was obtained through neutralization, washing with water, and drying by normal methods.

The obtained polyvinyl acetal resin was dissolved in DMSO-$D_6$ (dimethylsulfoxide), and analyzed by $^{13}$C-NMR (nuclear magnetic resonance spectrum) to fail to identify the presence of a constitutional unit with an acid-modified group.

Table 1 shows the acetal group content, the acetyl group content, and the hydroxyl group content measured by $^{13}$C-NMR.

An epoxy resin composition was produced as in Example 1, except that the obtained modified polyvinyl acetal resin was used.

COMPARATIVE EXAMPLE 3

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 25 g of acetaldehyde, and 80 g of butyraldehyde. The acetalization reaction was carried out to precipitate a reaction product by maintaining the solution temperature at 40° C.

The polyvinyl alcohol used had an average degree of polymerization of 1,500 and a degree of saponification of 98.8 mol %.

Then, the reaction solution was held to maintain the temperature at 40° C. for three hours, thereby completing the reaction. A modified polyvinyl acetal resin powder was obtained through neutralization, washing with water, and drying by normal methods.

The obtained polyvinyl acetal resin was dissolved in DMSO-$D_6$ (dimethylsulfoxide), and analyzed by $^{13}$C-NMR (nuclear magnetic resonance spectrum) to fail to identify the presence of of a constitutional unit with an acid-modified group.

Table 1 shows the acetal group content, the acetyl group content, and the hydroxyl group content measured by $^{13}$C-NMR.

An epoxy resin composition was produced as in Example 1, except that the obtained modified polyvinyl acetal resin was used.

COMPARATIVE EXAMPLES 4 TO 6

Epoxy resin compositions were produced as in Example 1, except that the modified polyvinyl acetal resin obtained in Comparative Example 1 was used and that the amount of the polyvinyl acetal resin and the type and amount of the reactive diluent were changed as shown in Table 1.

The reactive diluent mentioned below was used in Comparative Example 5.
(Reactive Diluent)
Polyglycerol polyglycidyl ether (EX521, product of Nagase ChemteX Corporation, epoxy equivalent of 183, molecular weight of 900)
<Evaluation>

The following evaluation was performed on the epoxy resin compositions obtained in the examples and comparative examples. Table 1 shows the results.
(Measurement of Viscosity and Thixotropic Index (TI))

Using a cone-plate viscometer Gemini (product of Bohlin Instruments Ltd.), the viscosity of the epoxy resin composition was measured at 25° C. The TI was obtained by dividing the viscosity at a shear rate of 1/s by the viscosity at a shear rate of 10/s.
(Confirmation of the Presence or Absence of Sea-Island Phase Separated Structure)

The epoxy resin composition was heated at 160° C. for one hour to be cured, thereby preparing a cured product.

The obtained cured product was cut with a cryo-microtome (product of Leica microsystems: UC7) into a test sample having a thickness of 70 nm. Specifically, a small piece obtained by trimming of the cured product was dyed in a 2% osmic acid aqueous solution at 60° C. for 12 hours, and then washed. Then, the temperature of the small piece of the cured product was set to −20° C., and cut with a cryo-microtome in a direction perpendicular to the thickness direction at a central portion in the thickness direction, and further cut to have a thickness of 70 nm. Thus, a test sample was prepared. The cut surface of the obtained test sample was observed using an electron microscope to confirm the presence or absence of the structure including: a continuous phase formed of a polymerized product of the reactive diluent and the epoxy resin; and a dispersion phase formed of the polyvinyl acetal resin dispersed in the continuous phase. Thus, the presence or absence of a sea-island phase separated structure was determined.

Figure 1:
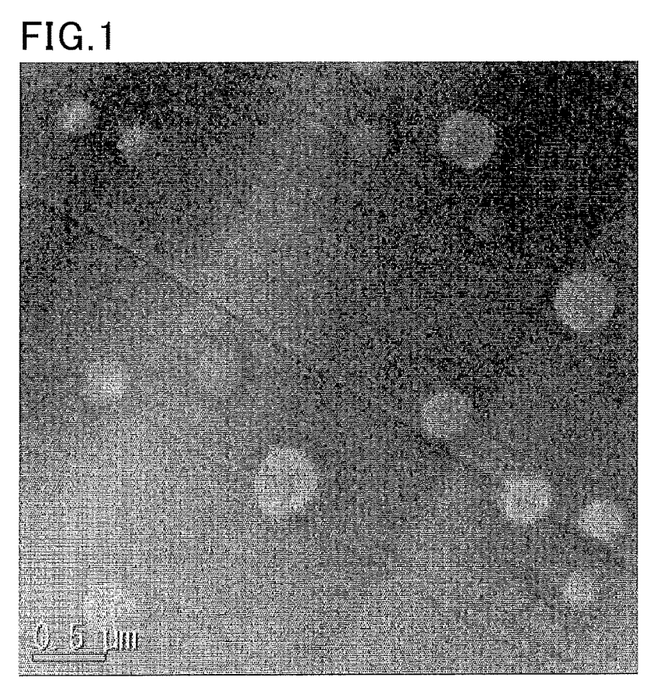
FIG. 1 is a scanning electron microscopic photograph of a cut surface of a cured product of an epoxy resin composition obtained in Example 1.
Figure 2:
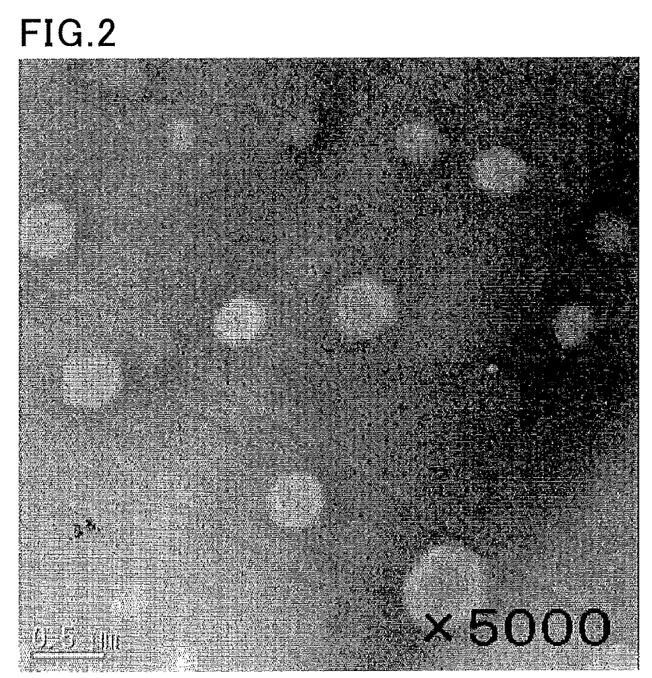
FIG. 2 is a scanning electron microscopic photograph of a cut surface of a cured product of the epoxy resin composition obtained in Example 1.

FIG. 1 and FIG. 2 each show a scanning electron microscopic photograph of a cut surface of a cured product of the epoxy resin composition obtained in Example 1.
(Measurement of Average Dispersion Diameter of Island Components)

The cut surface of the cured product obtained in (Confirmation of the presence or absence of sea-island phase separated structure) was observed using a transmission electron microscope. The Feret's diameters of 200 island components (dispersion phase) were measured and the average was calculated, thereby obtaining the average dispersion diameter.

(Measurement of Flattening of Island Components)

The cut surface of the cured product obtained in (Confirmation of the presence or absence of sea-island phase separated structure) was observed using a transmission electron microscope. The proportion of the minor axis to the major axis of 200 island components (dispersion phase) were measured and the average was calculated, thereby obtaining the flattening.

(Confirmation of the Number of Island Components)

The cut surface of the cured product obtained in (Confirmation of the presence or absence of sea-island phase separated structure) was observed using a transmission electron microscope. The number of the island components per 10 μm×10 μm was confirmed.

(Measurement of tan δ Change Rate)

Using a dynamic viscoelastometer (product of IT Measurement Co., Ltd., DVA-200), tan δ of the cured product obtained in (Confirmation of the presence or absence of sea-island phase separated structure) was measured.

The epoxy resin compositions obtained in the examples and comparative examples were also prepared without adding a polyvinyl acetal resin. Each obtained resin composition was heated at 160° C. for one hour to prepare a cured product. The tan δ of the obtained cured product (no PVB added) was similarly measured, and the tan δ change rate (%) was obtained from the following formula.

tan δ change rate=(tan δ of cured product/tan δ of cured product (no PVB added))×100.

(Impact Resistance)

The obtained resin composition was poured into a mold and heated at 160° C. for one hour, thereby preparing a resin cured product. The obtained resin cured product was subjected to a Charpy impact test by a method in conformity with JIS K 7111 using a digital impact tester DG-UB type (product of Toyo Seiki Seisakusho, Ltd.). Based on the measured Charpy impact value (kJ/m$^2$) upon breakage of the resin cured product, the impact resistance was evaluated.

(Elongation at Break, Elastic Modulus)

The obtained epoxy resin composition was poured into a release-treated specimen mold made of Teflon (®) and heated at 160° C. for one hour to prepare a specimen having a shape of Type 1 dumbbell (JIS K 7161).

The elongation at break (%) and the elastic modulus (MPa) of the obtained specimen were measured using an AUTOGRAPH (AGS-J, product of Shimadzu Corporation) at a tension speed of 5 mm/min by a method in conformity with JIS K 7161.

(T-Peel Strength)

By a method in conformity with JIS K 6854-3, two SPCC steel plates were bonded to each other with the obtained resin composition applied thereto, and the obtained specimen was heated at 160° C. for one hour so that the resin composition was cured. The T-peel strength (N/25 mm) was measured under the conditions of a peel angle of 180 degrees and a peel rate of 200 mm/min.

(Initial Viscosity)

The viscosity (Pa·s) of the obtained epoxy resin composition was measured using a cone-plate viscometer Gemini (product of Bohlin Instruments Ltd.) at 25° C. and at a shear rate of 20 s$^{-1}$, and evaluated based on the following criteria.

∘∘ (Excellent): viscosity of not less than 2.0 Pa·s but less than 3.0 Pa·s

∘ (Good): viscosity of not less than 3.0 Pa·s but less than 5.0 Pa·s

Δ (Fair): viscosity of not less than 5.0 Pa·s but less than 7.0 Pa·s

× (Poor): viscosity of not less than 7.0 Pa·s (Storage Stability)

The obtained epoxy resin composition was left to stand in an oven at 40° C. The viscosity right after the preparation and after standing for 30 days were measured using a cone-plate viscometer Gemini (product of Bohlin Instruments Ltd.). The change rate (%) of the viscosity was determined and evaluated based on the following criteria.

∘∘ (Good): viscosity change rate of less than 5%

Δ (Fair): viscosity change rate of not less than 5% but less than 30%

Δ (Poor): viscosity change rate of not less than 30%

(Heat Resistance)

By a method in conformity with JIS K 6854-3, two SPCC steel plates were bonded to each other with the obtained resin composition applied thereto, and the obtained specimen was heated at 160° C. for one hour so that the resin composition was cured. Thus, a T-peel strength specimen was prepared. Then, the specimen was left to stand in an oven at 80°. The T-peel strength (N/25 mm) of the specimen was measured right after the preparation and after standing for 30 days under the conditions of a peel angle of 180 degrees and a peel rate of 200 mm/min, and evaluated based on the following criteria.

∘∘ (Good): T-peel strength change rate of less than 10%

Δ (Fair): T-peel strength change rate of not less than 10% but less than 20%

× (Poor): T-peel strength change rate of not less than 20%

(Solvent Resistance)

The obtained resin composition was applied to an aluminum sheet to prepare a sheet having a thickness of 50 μm. The obtained sheet was immersed in an ethanol/toluene solvent mixture (weight ratio 1:1) for 24 hours. The weight change rate between before and after the immersion [(weight after immersion/weight before immersion)×100] (%) was calculated, and evaluated based on the following criteria.

∘∘ (Excellent): weight change rate of not less than 95%

∘ (Good): weight change rate of not less than 85% but less than 95%

Δ (Fair): weight change rate of not less than 75% but less than 85%

× (Poor): weight change rate of less than 75%

TABLE 1

|  |  | Example 1 | Example 2 | Example 3 | Example 4 |
|---|---|---|---|---|---|
| Polyvinyl acetal resin | Average degree of polymerization | 1500 | 2600 | 1500 | 1500 |
|  | Total acetal group content (mol %) | 73.6 | 73.6 | 71.5 | 65 |
|  | Acetoacetal group content (mol %) | 66.2 | 66.2 | 64.7 | 58.5 |
|  | Butyral group content (mol %) | 7.4 | 7.4 | 6.8 | 6.5 |
|  | Acetoacetal group content:Butyral group content | 9:1 | 9:1 | 9:1 | 9:1 |

TABLE 1-continued

|  |  | | | | |
|---|---|---|---|---|---|
|  | Acetyl group content (mol %) | 1.2 | 1.2 | 1.2 | 1.2 |
|  | Hydroxyl group content (mol %) | 24.2 | 24.2 | 25.3 | 23.8 |
|  | Amount of constitutional unit with acid-modified group (mol %) | 1.0 | 1.0 | 2.0 | 10.0 |
|  | Type of acid-modified group | Carboxylic acid | Carboxylic acid | Carboxylic acid | Carboxylic acid |
|  | Amount (parts by weight) | 20 | 20 | 20 | 20 |
| Epoxy resin (parts by weight) | Bisphenol A-type epoxy resin | 80 | 80 | 80 | 80 |
| Reactive diluent (parts by weight) | Polypropylene glycol diglycidyl ether | 20 | 20 | 20 | 20 |
|  | 1,6-hexanediol diglycidyl ether | — | — | — | — |
|  | Polyglycerol polyglycidyl ether | — | — | — | — |
| Acid-modified group number/epoxy group numbner |  | 0.013 | 0.013 | 0.026 | 0.120 |
| Curing agent (parts by weight) | Dicyandiamide | 3.0 | 3.0 | 3.0 | 3.0 |
|  | Imidazole compound | 2.0 | 2.0 | 2.0 | 2.0 |
| Inorganic filler (parts by weight) | Calcium carbonate | 20.0 | 20.0 | 20.0 | 20.0 |
| Viscosity (Pa · s) | Shear rate 1/s | 285.4 | 312.6 | 386.6 | 372.5 |
|  | Shear rate 10/s | 52.1 | 60.2 | 82.5 | 118.2 |
| T I |  | 5.5 | 5.2 | 4.7 | 3.2 |
| Presence or absence of sea-island phase separation structure |  | Present | Present | Present | Present |
| Average dispersion diameter of island components (μm) |  | 0.45 | 0.28 | 0.32 | 0.21 |
| Flattening of island components |  | 0.125 | 0.139 | 0.143 | 0.13 |
| Number of island components per unit area (pcs/10 μm × 10 μm) |  | 892 | 842 | 810 | 825 |
| tanδ change rate (%) |  | 5.1 | 5.6 | 4.1 | 3.8 |
| Evaluation | Impact resistance (kJ/m$^2$) | 3.1 | 3.8 | 4.0 | 5.1 |
|  | Elongation at break (%) | 7.9 | 8.2 | 9.0 | 12.5 |
|  | Elastic modulus (MPa) | 3125 | 3120 | 3140 | 3150 |
|  | T-peel strength (N/25 mm) | 46.7 | 48.2 | 51.7 | 58.5 |
|  | Initial viscosity (Pa · s) | ○ | ○○ | ○ | ○ |
|  | Storage stability | ○○ | ○○ | ○○ | ○○ |
|  | Heat resistance | ○○ | ○○ | ○○ | ○○ |
|  | Solvent resistance | ○○ | ○○ | ○○ | ○○ |

|  |  | Example 5 | Example 6 | Example 7 | Example 8 |
|---|---|---|---|---|---|
| Polyvinyl acetal resin | Average degree of polymerization | 1500 | 1500 | 1500 | 1500 |
|  | Total acetal group content (mol %) | 73.6 | 73.6 | 73.6 | 73.6 |
|  | Acetoacetal group content (mol %) | 73.6 | 66.2 | 66.2 | 66.2 |
|  | Butyral group content (mol %) | 0 | 7.4 | 7.4 | 7.4 |
|  | Acetoacetal group content:Butyral group content | 10:0 | 9:1 | 9:1 | 9:1 |
|  | Acetyl group content (mol %) | 1.2 | 1.2 | 1.2 | 1.2 |
|  | Hydroxyl group content (mol %) | 24.2 | 24.2 | 24.2 | 24.2 |
|  | Amount of constitutional unit with acid-modified group (mol %) | 1.0 | 1.0 | 1.0 | 1.0 |
|  | Type of acid-modified group | Carboxylic acid | Carboxylic acid | Carboxylic acid | Carboxylic acid |
|  | Amount (parts by weight) | 20 | 10 | 30 | 20 |
| Epoxy resin (parts by weight) | Bisphenol A-type epoxy resin | 80 | 80 | 80 | 80 |
| Reactive diluent (parts by weight) | Polypropylene glycol diglycidyl ether | 20 | 20 | 20 | — |
|  | 1,6-hexanediol diglycidyl ether | — | — | — | 20 |
|  | Polyglycerol polyglycidyl ether | — | — | — | — |
| Acid-modified group number/epoxy group numbner |  | 0.014 | 0.007 | 0.020 | 0.013 |
| Curing agent (parts by weight) | Dicyandiamide | 3.0 | 3.0 | 3.0 | 3.0 |
|  | Imidazole compound | 2.0 | 2.0 | 2.0 | 2.0 |
| Inorganic filler (parts by weight) | Calcium carbonate | 20.0 | 20.0 | 20.0 | 20.0 |
| Viscosity (Pa · s) | Shear rate 1/s | 263.5 | 217.6 | 386.5 | 359.9 |
|  | Shear rate 10/s | 40.9 | 72.4 | 56.2 | 51.2 |
| T I |  | 6.4 | 3.0 | 6.9 | 7.0 |
| Presence or absence of sea-island phase separation structure |  | Present | Present | Present | Present |
| Average dispersion diameter of island components (μm) |  | 0.2 | 0.42 | 0.5 | 2.8 |
| Flattening of island components |  | 0.121 | 0.133 | 0.142 | 0.138 |
| Number of island components per unit area (pcs/10 μm × 10 μm) |  | 901 | 848 | 827 | 859 |
| tanδ change rate (%) |  | 2.7 | 3.7 | 9.2 | 15.2 |
| Evaluation | Impact resistance (kJ/m$^2$) | 3.3 | 2.6 | 4.1 | 2.9 |
|  | Elongation at break (%) | 7.8 | 6.1 | 11.1 | 9.0 |
|  | Elastic modulus (MPa) | 3210 | 3130 | 3160 | 3130 |
|  | T-peel strength (N/25 mm) | 45.2 | 40.1 | 49.9 | 44.4 |
|  | Initial viscosity (Pa · s) | ○○ | ○○ | ○ | ○○ |
|  | Storage stability | ○○ | ○○ | Δ | ○○ |
|  | Heat resistance | ○○ | ○○ | ○○ | ○○ |
|  | Solvent resistance | ○○ | ○○ | ○○ | ○○ |

TABLE 1-continued

|  |  | Example 9 | Example 10 | Example 11 | Example 12 |
|---|---|---|---|---|---|
| Polyvinyl acetal resin | Average degree of polymerization | 1500 | 1500 | 1500 | 320 |
|  | Total acetal group content (mol %) | 73.6 | 56.6 | 73.6 | 74.05 |
|  | Acetoacetal group content (mol %) | 66.2 | 50.9 | 44.2 | 66.75 |
|  | Butyral group content (mol %) | 7.4 | 5.7 | 29.4 | 7.3 |
|  | Acetoacetal group content:Butyral group content | 9:1 | 9:1 | 6:4 | 9:1 |
|  | Acetyl group content (mol %) | 1.2 | 1.2 | 1.2 | 1.2 |
|  | Hydroxyl group content (mol %) | 24.2 | 24.2 | 24.2 | 24.7 |
|  | Amount of constitutional unit with acid-modified group (mol %) | 1.0 | 18.0 | 1.0 | 0.05 |
|  | Type of acid-modified group | Carboxylic acid | Carboxylic acid | Carboxylic acid | Carboxylic acid |
|  | Amount (parts by weight) | 20 | 20 | 20 | 20 |
| Epoxy resin (parts by weight) | Bisphenol A-type epoxy resin | 70 | 80 | 80 | 80 |
| Reactive diluent (parts by weight) | Polypropylene glycol diglycidyl ether | 30 | 20 | 20 | 20 |
|  | 1,6-hexanediol diglycidyl ether | — | — | — | — |
|  | Polyglycerol polyglycidyl ether | — | — | — | — |
| Acid-modified group number/epoxy group numbner |  | 0.013 | 0.197 | 0.013 | 0.001 |
| Curing agent (parts by weight) | Dicyandiamide | 3.0 | 3.0 | 3.0 | 3.0 |
|  | Imidazole compound | 2.0 | 2.0 | 2.0 | 2.0 |
| Inorganic filler (parts by weight) | Calcium carbonate | 20.0 | 20.0 | 20.0 | 20.0 |
| Viscosity (Pa · s) | Shear rate 1/s | 321.2 | 425.3 | 495.6 | 192.5 |
|  | Shear rate 10/s | 102.5 | 165.5 | 73.6 | 43.6 |
| T I |  | 3.1 | 2.6 | 6.7 | 4.4 |
| Presence or absence of sea-island phase separation structure |  | Present | Present | Present | Present |
| Average dispersion diameter of island components (μm) |  | 2.6 | 0.18 | 4.7 | 3.4 |
| Flattening of island components |  | 0.34 | 0.31 | 0.384 | 0.225 |
| Number of island components per unit area (pcs/10 μm × 10 μm) |  | 442 | 466 | 410 | 966 |
| tanδ change rate (%) |  | 21.2 | 1.7 | 24.6 | 17.6 |
| Evaluation | Impact resistance (kJ/m$^2$) | 3.5 | 2.7 | 2.3 | 2.2 |
|  | Elongation at break (%) | 9.5 | 7.5 | 7.0 | 5.4 |
|  | Elastic modulus (MPa) | 2980 | 3120 | 3050 | 2880 |
|  | T-peel strength (N/25 mm) | 48.5 | 64.3 | 43.2 | 28.2 |
|  | Initial viscosity (Pa · s) | ○○ | ○ | Δ | ○○ |
|  | Storage stability | ○○ | Δ | Δ | ○○ |
|  | Heat resistance | ○○ | Δ | Δ | ○ |
|  | Solvent resistance | ○○ | ○○ | ○ | ○ |

|  |  | Example 13 | Example 14 | Example 15 |
|---|---|---|---|---|
| Polyvinyl acetal resin | Average degree of polymerization | 1500 | 1500 | 1500 |
|  | Total acetal group content (mol %) | 49.6 | 73.6 | 73.6 |
|  | Acetoacetal group content (mol %) | 44.7 | 66.2 | 66.2 |
|  | Butyral group content (mol %) | 4.9 | 7.4 | 7.4 |
|  | Acetoacetal group content:Butyral group content | 9:1 | 9:1 | 9:1 |
|  | Acetyl group content (mol %) | 1.2 | 1.2 | 1.2 |
|  | Hydroxyl group content (mol %) | 26.2 | 24.2 | 24.2 |
|  | Amount of constitutional unit with acid-modified group (mol %) | 23.0 | 1.0 | 1.0 |
|  | Type of acid-modified group | Carboxylic acid | Carboxylic acid | Carboxylic acid |
|  | Amount (parts by weight) | 20 | 20 | 20 |
| Epoxy resin (parts by weight) | Bisphenol A-type epoxy resin | 80 | 55 | 95 |
| Reactive diluent (parts by weight) | Polypropylene glycol diglycidyl ether | 20 | 45 | 5 |
|  | 1,6-hexanediol diglycidyl ether | — | — | — |
|  | Polyglycerol polyglycidyl ether | — | — | — |
| Acid-modified group number/epoxy group numbner |  | 0.241 | 0.013 | 0.014 |
| Curing agent (parts by weight) | Dicyandiamide | 3.0 | 3.0 | 3.0 |
|  | Imidazole compound | 2.0 | 2.0 | 2.0 |
| Inorganic filler (parts by weight) | Calcium carbonate | 20.0 | 20.0 | 20.0 |
| Viscosity (Pa · s) | Shear rate 1/s | 454.5 | 168.5 | 542.1 |
|  | Shear rate 10/s | 215.8 | 17.2 | 245.6 |
| T I |  | 2.1 | 9.8 | 2.2 |
| Presence or absence of sea-island phase separation structure |  | Present | Present | Present |
| Average dispersion diameter of island components (μm) |  | 0.13 | 4.8 | 0.18 |
| Flattening of island components |  | 0.41 | 0.47 | 0.123 |
| Number of island components per unit area (pcs/10 μm × 10 μm) |  | 218 | 222 | 982 |
| tanδ change rate (%) |  | 1.4 | 40.7 | 4.9 |
| Evaluation | Impact resistance (kJ/m$^2$) | 2.3 | 3.1 | 2.0 |
|  | Elongation at break (%) | 7.0 | 7.4 | 4.7 |
|  | Elastic modulus (MPa) | 3350 | 2590 | 3450 |

TABLE 1-continued

|  |  | | | |
|---|---|---|---|---|
|  | T-peel strength (N/25 mm) | 68.0 | 36.7 | 32.1 |
|  | Initial viscosity (Pa · s) | x | ○ | x |
|  | Storage stability | Δ | Δ | ○○ |
|  | Heat resistance | ○○ | Δ | ○○ |
|  | Solvent resistance | ○○ | Δ | ○○ |

|  |  | Comparative Example 1 | Comparative Example 2 | Comparative Example 3 |
|---|---|---|---|---|
| Polyvinyl acetal resin | Average degree of polymerization | 1500 | 1500 | 1500 |
|  | Total acetal group content (mol %) | 74.6 | 74.6 | 74.6 |
|  | Acetoacetal group content (mol %) | 67.1 | 74.6 | 22.4 |
|  | Butyral group content (mol %) | 7.5 | 0 | 52.2 |
|  | Acetoacetal group content:Butyral group content | 9:1 | 0:10 | 3:7 |
|  | Acetyl group content (mol %) | 1.2 | 1.2 | 1.2 |
|  | Hydroxyl group content (mol %) | 24.2 | 24.2 | 24.2 |
|  | Amount of constitutional unit with acid-modified group (mol %) | 0.0 | 0.0 | 0.0 |
|  | Type of acid-modified group | — | — | — |
|  | Amount (parts by weight) | 20 | 20 | 20 |
| Epoxy resin (parts by weight) | Bisphenol A-type epoxy resin | 80 | 80 | 80 |
| Reactive diluent (parts by weight) | Polypropylene glycol diglycidyl ether | 20 | 20 | 20 |
|  | 1,6-hexanediol diglycidyl ether | — | — | — |
|  | Polyglycerol polyglycidyl ether | — | — | — |
| Acid-modified group number/epoxy group number |  | — | — | — |
| Curing agent (parts by weight) | Dicyandiamide | 3.0 | 3.0 | 3.0 |
|  | Imidazole compound | 2.0 | 2.0 | 2.0 |
| Inorganic filler (parts by weight) | Calcium carbonate | 20.0 | 20.0 | 20.0 |
| Viscosity (Pa · s) | Shear rate 1/s | 214.3 | 724.8 | 695.4 |
|  | Shear rate 10/s | 38.5 | 452.2 | 385.7 |
| T I |  | 5.6 | 1.6 | 1.8 |
| Presence or absence of sea-island phase separation structure |  | Absent (bicontinuous) | Absent (compatibilized) | Absent (bicontinuous) |
| Average dispersion diameter of island components (μm) |  | — | — | — |
| Flattening of island components |  | — | — | — |
| Number of island components per unit area (pcs/10 μm × 10 μm) |  | — | — | — |
| tanδ change rate (%) |  | 27.5 | 38.7 | 32.2 |
| Evaluation | Impact resistance (kJ/m²) | 1.3 | 1.5 | 1.2 |
|  | Elongation at break (%) | 4.3 | 2.7 | 3.5 |
|  | Elastic modulus (MPa) | 2675 | 2250 | 2450 |
|  | T-peel strength (N/25 mm) | 34.1 | 30.2 | 31.8 |
|  | Initial viscosity (Pa · s) | ○ | x | x |
|  | Storage stability | Δ | x | x |
|  | Heat resistance | x | x | x |
|  | Solvent resistance | x | x | x |

|  |  | Comparative Example 4 | Comparative Example 5 | Comparative Example 6 |
|---|---|---|---|---|
| Polyvinyl acetal resin | Average degree of polymerization | 1500 | 1500 | 1500 |
|  | Total acetal group content (mol %) | 74.6 | 74.6 | 74.6 |
|  | Acetoacetal group content (mol %) | 67.1 | 67.1 | 67.1 |
|  | Butyral group content (mol %) | 7.5 | 7.5 | 7.5 |
|  | Acetoacetal group content:Butyral group content | 9:1 | 9:1 | 9:1 |
|  | Acetyl group content (mol %) | 1.2 | 1.2 | 1.2 |
|  | Hydroxyl group content (mol %) | 24.2 | 24.2 | 24.2 |
|  | Amount of constitutional unit with acid-modified group (mol %) | 0.0 | 0.0 | 0.0 |
|  | Type of acid-modified group | — | — | — |
|  | Amount (parts by weight) | 60 | 20 | 20 |
| Epoxy resin (parts by weight) | Bisphenol A-type epoxy resin | 80 | 80 | 40 |
| Reactive diluent (parts by weight) | Polypropylene glycol diglycidyl ether | 20 | — | 60 |
|  | 1,6-hexanediol diglycidyl ether | — | — | — |
|  | Polyglycerol polyglycidyl ether | — | 20 | — |
| Acid-modified group number/epoxy group number |  | — | — | — |
| Curing agent (parts by weight) | Dicyandiamide | 3.0 | 3.0 | 3.0 |
|  | Imidazole compound | 2.0 | 2.0 | 2.0 |
| Inorganic filler (parts by weight) | Calcium carbonate | 20.0 | 20.0 | 20.0 |

TABLE 1-continued

| | | | | |
|---|---|---|---|---|
| Viscosity (Pa · s) | Shear rate 1/s | 788.9 | 782.2 | 112.2 |
| | Shear rate 10/s | 552.8 | 453.6 | 9.5 |
| T I | | 1.4 | 1.7 | 11.8 |
| Presence or absence of sea-island phase separation structure | | Absent (bicontinuous) | Absent (bleeded) | Absent (compatibilized) |
| Average dispersion diameter of island components (μm) | | — | — | — |
| Flattening of island components | | — | — | — |
| Number of island components per unit area (pcs/10 μm × 10 μm) | | — | — | — |
| tanδ change rate (%) | | 45.6 | — | 52.5 |
| Evaluation | Impact resistance (kJ/m²) | 1.8 | 1.1 | 1.7 |
| | Elongation at break (%) | 5.1 | 2.1 | 4.6 |
| | Elastic modulus (MPa) | 2120 | 2790 | 1850 |
| | T-peel strength (N/25 mm) | 35.5 | 29.0 | 27.5 |
| | Initial viscosity (Pa · s) | x | Δ | ○ |
| | Storage stability | x | Δ | x |
| | Heat resistance | x | x | x |
| | Solvent resistance | x | x | x |

INDUSTRIAL APPLICABILITY

The present invention can provide an epoxy resin composition that is provided with flexibility to combine impact resistance and mechanical strength, while maintaining epoxy resin-specific high elastic modulus, that reduces an increase in viscosity due to mixing, and that is excellent in heat resistance, storage stability, and solvent resistance.

The invention claimed is:

1. An epoxy resin composition comprising:
    a modified polyvinyl acetal resin having a constitutional unit with an acid-modified group;
    a reactive diluent; and
    an epoxy resin,
    the epoxy resin composition having a sea-island phase separated structure after being cured, and
    the modified polyvinyl acetal resin containing an acetoacetal group and a butyral group at a ratio of 6:4 to 10:0, and having an acetal group content of 60 to 90 mol %.
2. The epoxy resin composition according to claim 1, wherein the sea-island phase separated structure includes island components having an average dispersion diameter of 5.0 μm or less.
3. The epoxy resin composition according to claim 1, wherein the amount of the constitutional unit with an acid-modified group in the modified polyvinyl acetal resin is 0.01 to 20.0 mol %.
4. The epoxy resin composition according to claim 1, wherein the modified polyvinyl acetal resin has an acetyl group content of 0.1 to 25 mol %.
5. The epoxy resin composition according to claim 1, wherein the amount of the modified polyvinyl acetal resin is 0.1 to 50 parts by weight relative to 100 parts by weight of the reactive diluent and the epoxy resin in total.
6. The epoxy resin composition according to claim 1, wherein the amount of the reactive diluent is 1 to 50% by weight relative to the total of the epoxy resin and the reactive diluent.
7. The epoxy resin composition according to claim 1, wherein the reactive diluent is an acyclic aliphatic compound having one to three glycidyl groups in a molecule.
8. The epoxy resin composition according to claim 1, wherein the ratio between the amount of the reactive diluent and the amount of the epoxy resin is 1:99 to 50:50.
9. A cured product obtained by curing the epoxy resin composition according to claim 1.
10. The epoxy resin composition according to claim 1, wherein the constitutional unit with an acid-modified group is at least one selected from the group consisting of a constitutional unit represented by the following formula (1-2), a constitutional unit represented by the following formula (1-3), and a constitutional unit represented by the following formula (1-4):

wherein in formula (1-2), $R^2$ and $R^3$ each independently represents a single bond or a C1-C10 alkylene group, and $X^2$ and $X^3$ each independently represents a hydrogen atom, a metal atom, or a methyl group;

wherein in formula (1-3), $R^4$ and $R^5$ each independently represents a single bond or a C1-C10 alkylene group, and $X^4$ and $X^5$ each independently represents a hydrogen atom, a metal atom, or a methyl group; and
wherein in formula (1-4), $R^6$ and $R^7$ each independently represents a single bond or a C1-C10 alkylene group, and $X^6$ and $X^7$ each independently represents a hydrogen atom, a metal atom, or a methyl group.

* * * * *